(12) United States Patent
Kim et al.

(10) Patent No.: US 9,992,845 B2
(45) Date of Patent: Jun. 5, 2018

(54) LED DRIVER CIRCUIT AND LIGHT APPARATUS HAVING THE SAME IN

(71) Applicant: Magnachip Semiconductor, Ltd., Cheongju-si (KR)

(72) Inventors: Hyun-Jung Kim, Cheongju-si (KR); Young-gi Ryu, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 160 days.

(21) Appl. No.: 13/693,620

(22) Filed: Dec. 4, 2012

(65) Prior Publication Data
US 2013/0169160 A1 Jul. 4, 2013

(30) Foreign Application Priority Data

Dec. 30, 2011 (KR) .......................... 10-2011-0147481

(51) Int. Cl.
*H05B 37/02* (2006.01)
*H05B 33/08* (2006.01)

(52) U.S. Cl.
CPC .......... *H05B 37/02* (2013.01); *H05B 33/083* (2013.01); *H05B 33/0812* (2013.01); *Y02B 20/343* (2013.01); *Y02B 20/345* (2013.01)

(58) Field of Classification Search
CPC .......... H05B 33/0815; H05B 33/0818; H05B 33/0851; H05B 33/0848; H05B 33/0821;
(Continued)

(56) References Cited

U.S. PATENT DOCUMENTS 4,800,303 A * 1/1989 Graham ............. H03K 19/0952
326/30
6,285,139 B1 * 9/2001 Ghanem ....................... 315/291
(Continued)

FOREIGN PATENT DOCUMENTS

CN 102045923 A 5/2011
JP 2011-87298 A 4/2011
(Continued)

OTHER PUBLICATIONS

Chinese Office Action dated Oct. 10, 2015 in counterpart Chinese Applcation No. 201210553863.2 (9 pages in Chinese).
(Continued)

*Primary Examiner* — James Hyonchol Cho
(74) *Attorney, Agent, or Firm* — NSIP Law (57) ABSTRACT

A light-emitting diode (LED) driver circuit and a light apparatus including the LED driver circuit are provided. The light apparatus includes an LED array, an input unit, a rectifier, and a control circuit. The LED array includes LED devices connected to one another in series. The input unit receives an alternating current (AC) power source. The rectifier circuit full-wave rectifies the received AC power source signal and supplies the full-wave rectified AC power source signal to the LED array. The control circuit selectively lights the LED devices according to a voltage level of the full-wave rectified AC power source signal. The control circuit includes switching elements and comparators. The switching elements selectively force nodes between the LED devices to be grounded. The comparators turn-on one of the switching elements according to the voltage level of the full-wave rectified AC power source signal.

19 Claims, 8 Drawing Sheets

(58) Field of Classification Search
CPC ............ H05B 33/0857; H05B 33/0809; H05B 33/0812; H05B 33/0845; Y02B 20/346; Y02B 20/347
USPC ............ 315/291, 307, 224, 200 R, 312, 294, 315/185 R, 297, 193, 209 R, 308, 186, 315/122
See application file for complete search history.

(56) References Cited

U.S. PATENT DOCUMENTS

| | | | |
|---|---|---|---|
| 7,439,944 B2* | 10/2008 | Huynh | H05B 33/0818 315/185 S |
| 7,781,979 B2 | 8/2010 | Lys | |
| 8,164,276 B2* | 4/2012 | Kuwabara | 315/294 |
| 8,384,311 B2 | 2/2013 | Gray et al. | |
| 8,536,790 B2* | 9/2013 | Inoue et al. | 315/82 |
| 8,598,796 B2* | 12/2013 | Jeong | H05B 33/083 315/185 R |
| 8,686,651 B2* | 4/2014 | Lynch et al. | 315/192 |
| 2006/0226819 A1* | 10/2006 | Xu et al. | 323/268 |
| 2008/0122376 A1 | 5/2008 | Lys | |
| 2010/0109537 A1* | 5/2010 | Nishino et al. | 315/185 R |
| 2010/0194298 A1* | 8/2010 | Kuwabara | H05B 33/083 315/186 |
| 2010/0308739 A1* | 12/2010 | Shteynberg et al. | 315/193 |
| 2011/0084619 A1* | 4/2011 | Gray et al. | 315/185 R |
| 2011/0199010 A1* | 8/2011 | Cho et al. | 315/186 |

FOREIGN PATENT DOCUMENTS

| | | |
|---|---|---|
| KR | 10-2011-0084619 A1 | 8/2011 |
| WO | WO 2008/060469 A2 | 5/2008 |

OTHER PUBLICATIONS

Korean Office Action dated Sep. 19, 2017 in counterpart Korean Patent Application No. 10-2011-0147481 (6 pages, in Korean).

* cited by examiner

LED DRIVER CIRCUIT AND LIGHT APPARATUS HAVING THE SAME IN

CROSS-REFERENCE TO RELATED APPLICATION(S)

This application claims priority under 35 U.S.C. § 119 from Korean Patent Application No. 10-2011-0147481, filed on Dec. 30, 2011, in the Korean Intellectual Property Office, the disclosure of which is incorporated herein by reference in its entirety.

BACKGROUND

1. Field

The following description relates to a light-emitting diode (LED) driver circuit and a light apparatus having the same, and more particularly, to an LED driver circuit that operates a plurality of LED devices at high efficiency, and a light apparatus having the same.

2. Description of the Related Art

A light-emitting diode (LED) is environment-friendly and enables impulse driving. Also, the LED has a high color rendering, adjusts light amounts of red (R), green (G), and blue (B) diodes to arbitrarily change a luminance, a color temperature, etc., and is appropriate for making an LCD panel light, thin, short, and small. Therefore, the LED has been widely used as a light source.

A light apparatus using an LED as described above requires a driver circuit that supplies a constant voltage to the LED. Therefore, the light apparatus would full-wave rectify an alternating current (AC) power source, sense a level of a full-wave-rectified voltage, and selectively apply a wave voltage to the LED according to the sensed level.

However, a high voltage sensing resistor is required to sense the level of the full-wave rectified voltage. As a result, it is difficult to make an LED driver circuit small. Also, a current flowing in the LED is not precisely controlled due to a scattering of high voltage sensing resistors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a light apparatus using light-emitting diode (LED) devices, the light apparatus including an LED array including LED devices operatively connected to one another in series. An input unit is configured to receive an alternating current (AC) power source signal. A rectifier circuit is configured to full-wave rectify the received AC power source signal and supply the full-wave rectified AC power source signal to the LED array. A control circuit configured to selectively light the LED devices according to a voltage level of the full-wave rectified AC power source signal. The control circuit includes switching elements configured to selectively force nodes between the LED devices to be grounded; and comparators configured to turn-on one of the switching elements according to the voltage level of the full-wave rectified AC power source signal.

A converter is configured to convert the full-wave rectified AC power source signal into a direct current (DC) power source signal having a preset level. A reference voltage generator IS configured to generate reference voltages having different voltage levels based on a voltage from the converter.

The converter is a junction gate field-effect transistor (JFET).

The JFET includes a drain configured to receive the full-wave rectified AC power source signal, a gate configured to be grounded, and a source configured to output the DC power source signal having the preset level.

The switching elements include n-channel metal-oxide semiconductor field-effect transistors (MOSFETs) (nMOSs).

The LED array includes a first LED device including an anode configured to receive the full-wave rectified AC power source signal; and a second LED device including an anode operatively connected to a cathode of the first LED device.

The switching elements include a first switching element including an end, which is commonly connected to the cathode of the first LED device and the anode of the second LED device, and another end, which is grounded through a resistor; and a second switching element including an end, which is connected to a cathode of the second LED device, and another end, which is grounded through the resistor.

The reference voltage generator generates a first reference voltage and a second reference voltage including a higher voltage level than the first reference voltage.

The comparators include a first comparator which, when the first reference voltage is higher than a voltage of the other end of the first switching element, turns-on the first switching element; and a second comparator which, when the second reference voltage is higher than a voltage of the other end of the second switching element, turns-off the second switching element.

In accordance with another illustrative example, there is provided an LED driver circuit configured to drive LED devices, the LED driver circuit including a converter configured to convert a full-wave rectified AC power source signal into a DC power source signal having a preset level; a reference voltage generator configured to generate reference voltages including different voltage levels based on a voltage from the converter; switching elements configured to selectively force nodes between the LED devices to be grounded; and comparators configured to compare a voltage level of the full-wave rectified AC power source signal with the reference voltages to turn-on one of the switching elements.

The converter includes a JFET.

The JFET includes a drain configured to receive the full-wave rectified AC power source signal, a gate configured to be grounded, and a source configured to output the DC power source signal having the preset level.

The switching elements include nMOSs.

The LED devices include a first LED device configured to include an anode, which receives the full-wave rectified AC power source signal; and a second LED device configured to include an anode operatively connected to a cathode of the first LED device. The switching elements include a first switching element configured to include an end, which is commonly connected to the cathode of the first LED device and the anode of the second LED device, and another end, which is grounded through a resistor; and a second switching element configured to include an end, which is connected to a cathode of the second LED device and another end, which is grounded through the resistor.

The reference voltage generator is configured to generate a first reference voltage and a second reference voltage including a higher voltage level than the first reference voltage.

The comparators include a first comparator which, when the first reference voltage is higher than a voltage of the other end of the first switching element, turns-on the first switching element; and a second comparator which, when the second reference voltage is higher than a voltage of the other end of the second switching element, turns-off the second switching element.

The comparators are configured to compare the voltage level of the full-wave rectified AC power source signal with the reference voltages to turn-on only one of the switching elements.

In accordance with another illustrative example, there is provided a light apparatus using light-emitting diode (LED) devices, the light apparatus including a rectifier circuit configured to full-wave rectify a received alternating current (AC) power source signal and supply the full-wave rectified AC power source signal to an LED array; and a control circuit configured to selectively light the LED devices according to a voltage level of the full-wave rectified AC power source signal by selectively forcing nodes between the LED devices to be grounded, and by turning-on one switching element according to the voltage level of the full-wave rectified AC power source signal.

A converter is configured to convert the full-wave rectified AC power source signal into a direct current (DC) power source signal having a preset level; and a reference voltage generator configured to generate reference voltages having different voltage levels based on a voltage from the converter, wherein the control circuit is configured to turn-on only one switching element according to the voltage level of the full-wave rectified AC power source signal.

The LED array includes a first LED device including an anode configured to receive the full-wave rectified AC power source signal, and a second LED device including an anode operatively connected to a cathode of the first LED device.

Therefore, the LED driver circuit and the light apparatus having the LED driver circuit may selectively the plurality of LED devices using comparator structures without an additional sensing circuit. Also, the LED driver circuit and the light apparatus may be configured as an integrated circuit (IC) package.

BRIEF DESCRIPTION OF THE DRAWINGS

The above and/or other aspects will be more apparent by describing certain exemplary configurations with reference to the accompanying drawings, in which.

DETAILED DESCRIPTION

Exemplary configurations are described in greater detail with reference to the accompanying drawings.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that when an element is referred to as being "on," "connected to," or "operatively connected to" another element or unit, it can be directly on or connected to another element or unit through intervening elements or units. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

The units described herein may be implemented using hardware components. The hardware components may include, for example, controllers, processors, generators, drivers, resistors, filters, transistors, junction gate field-effect transistor (JFET), metal-oxide-semiconductor field-effect transistor (MOSFETs), metal-insulator-semiconductor FET (MISFETs), metal-oxide-semiconductors (MOSs), and other equivalent electronic components.

Figure 1:
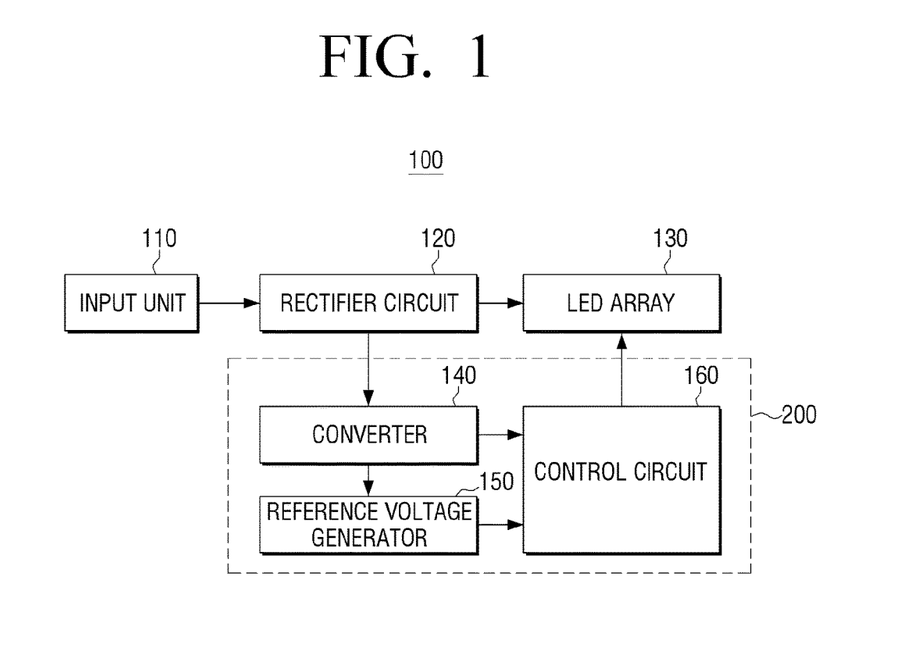
FIG. 1 is a block diagram illustrating a structure of a light apparatus, according to an illustrative configuration.

FIG. 1 is a block diagram illustrating a structure of a light apparatus 100, according to an illustrative configuration.

Referring to FIG. 1, the light apparatus 100 includes an input unit 110, a rectifier circuit 120, a light-emitting diode (LED) array 130, a converter 140, a reference voltage generator 150, and a control circuit 160.

The input unit 110 receives an alternating current (AC) power source or a direct current (DC) power source.

The rectifier circuit 120 full-wave rectifies the received AC power source signal and supplies the full-wave rectified AC power source signal to the LED array 130. That is, the rectifier circuit 120 supplies the full-wave rectified AC power source signal to the converter 140 and the LED array 130.

The LED array 130 includes a plurality of LED devices which are connected to one another in series. One LED array may be used in accordance with one configuration, but a plurality of LED arrays may be also used. Also, a plurality of groups of LED devices connected to one another in parallel may connected to one another in series to realize an LED array.

The converter 140 converts the full-wave rectified AC power source signal into a DC power source signal having a preset level. In detail, the converter 140 converts the full-wave rectified AC power source signal from the rectifier circuit 120 into the DC power source signal having the preset level. The converter 140 may be configured as a junction gate field-effect transistor (HET) or a general AC/DC converter.

Figure 2:
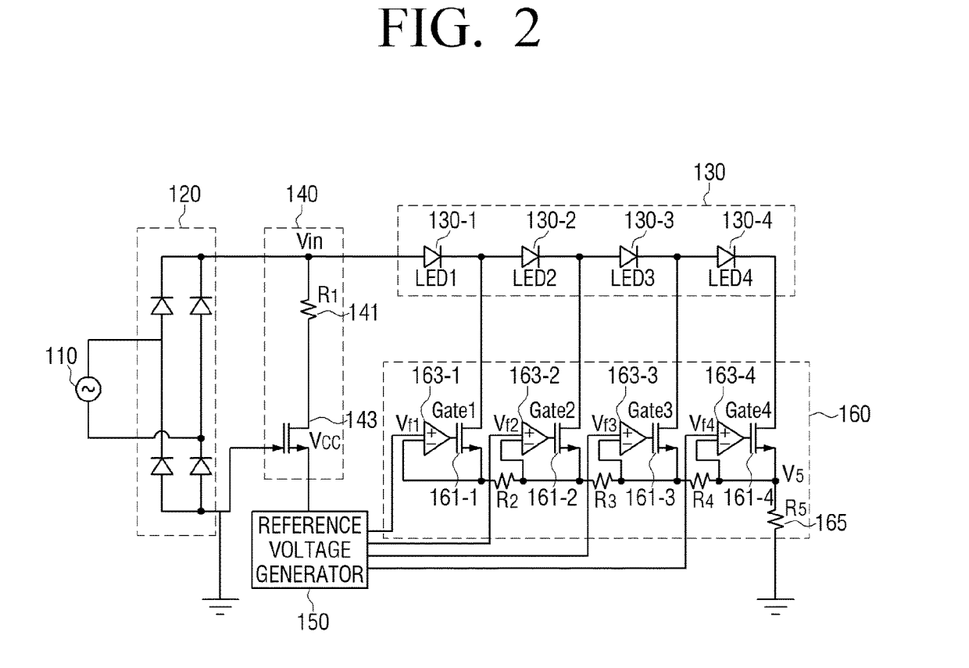
FIG. 2 is a circuit diagram of the light apparatus of FIG. 1, according to an illustrative configuration.

Using a converted voltage, the reference voltage generator 150 generates a plurality of reference voltages having different voltage levels. For example, the reference voltage generator 150 uses the DC power source signal from the converter 140 to generate a plurality of reference voltages having different voltage levels. The number of reference voltages corresponds to the number of comparators in the control circuit 160 which will be described later. For example, if the control circuit 160 includes four comparators as shown in FIG. 2, the reference voltage generator 150 generates four reference voltages having different voltage values. The levels of the reference voltages generated by the reference voltage generator 150 may be changed according to an environment of a particular system, and optimum levels of reference voltage values for the particular system may be selected as the levels of the reference voltages.

The control circuit 160 selectively lights on and off the plurality of LED devices according to the levels of the reference voltage values and the DC power source signal based on the full-wave rectified AC power source signal. In detail, the control circuit 160 includes a plurality of switching elements and a plurality of comparators. The control circuit 160 lights the LED devices and controls the number of LED devices to emit light according to the levels of the reference voltage values and the DC power source signal based on the full-wave rectified AC power source signal and. Detailed structure and operation of the control circuit 160 will be described with reference to FIG. 2.

As described above, the light apparatus 100, according to an illustrative configuration, may drive a plurality of LED devices using simple comparators and switching elements without an additional sensing circuit. Therefore, the light apparatus may be of a small or compact size. Also, the light apparatus may change the number of LED devices, which selectively emit light in response to a level of an input AC power source, to drive the LED devices at a high efficiency.

The converter 140, the reference voltage generator 150, and the control circuit 160 are separately installed as described with reference to FIG. 1 but may be integrated into a single chip or one apparatus (e.g., an LED driver apparatus).

FIG. 2 is a circuit diagram of the light apparatus 100 of FIG. 1.

Referring to FIG. 2, the light apparatus 100 according to the present illustrative configuration includes the input unit 110, the rectifier circuit 120, the LED array 130, the converter 140, the reference voltage generator 150, and the control circuit 160.

The input unit 110 receives the AC power source signal.

The rectifier circuit 120 full-wave rectifies the received AC power source signal and supplies the full-wave rectified AC power source signal to the LED array 130. Although FIG. 2 illustrates that the LED array 130 is operatively connected to the rectifier circuit 120 through the converter 140, the LED array 130 may be also directly connected to the rectifier circuit 120 or operatively connected to the rectifier circuit 120 through other electrical components. In one example, the rectifier circuit 120 may be realized as a bridge full-wave rectifier circuit including four diodes.

The LED array 130 includes a plurality of LED devices which are connected to one another in series. In detail, the LED array 130 includes first, second, third, and fourth LED devices 130-1, 130-2, 130-3, and 130-4. The LED array 130 also includes four LED devices in the present exemplary configuration but may include at least two or more LED devices.

The first LED device 130-1 includes an anode, which receives the full-wave rectified AC power source signal and a cathode, which is commonly connected to an anode of the second LED device 130-2 and an end of a first switching element 161-1.

The second LED device 130-2 includes the anode, which is commonly connected to the cathode of the first LED device 130-1 and an end of the first switching element 161-1, and a cathode, which is commonly connected to an anode of the third LED device 130-3 and a second switching element 161-2.

The third LED device 130-3 includes an anode, which is commonly connected to the cathode of the second LED device 130-2 and an end of the second switching element 161-2, and a cathode, which is commonly connected to an anode of the fourth LED device 130-4 and an end of the third switching element 161-3.

The fourth LED device 130-4 includes an anode, which is commonly connected to the cathode of the third LED device 130-3 and an end of the third switching element 161-3, and a cathode, which is commonly connected to an end of the switching element 161-4.

The converter 140 converts the full-wave rectified AC power source signal into the DC power source signal having the preset level. In one example, the converter 140 may be configured to include a JFET, as a general AC/DC converter, or other similar device.

Figure 8:
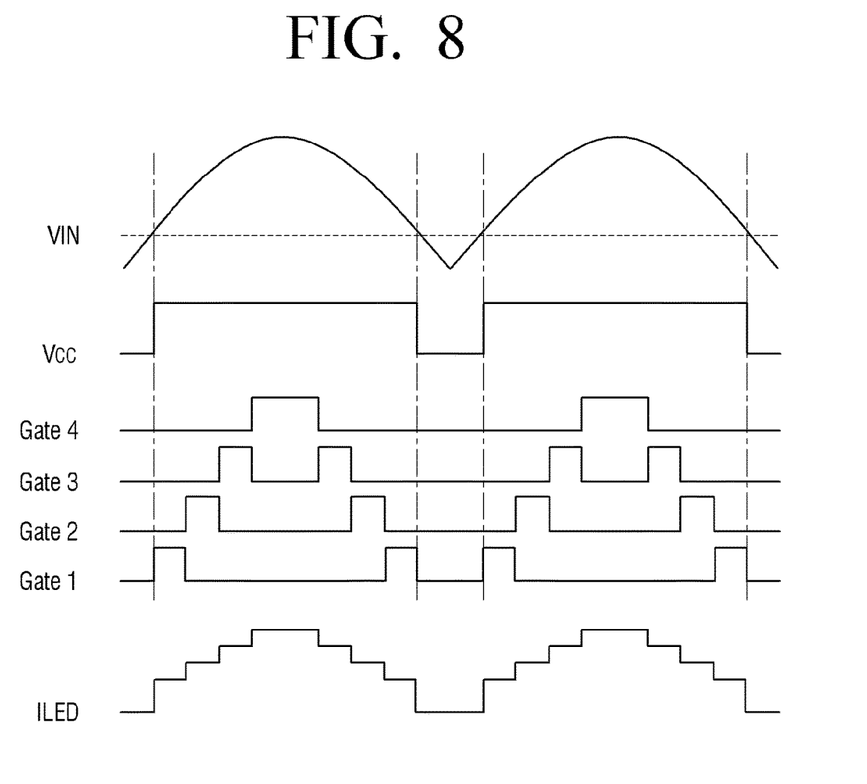
FIG. 8 is a view illustrating waveforms of nodes shown in FIG. 2.

In one instance, the converter 140 includes a JFET 143. The JFET 143 includes a drain, which receives the full-wave rectified AC power through a resistor R1, a gate which is grounded, and a source, which outputs a DC power source signal, Vcc, having a preset level (e.g., 15V) to a reference voltage generator 150. FIG. 8 illustrates a waveform of the DC power source signal, Vcc, generated to correspond to the input full-wave rectified AC power source signal.

The reference voltage generator 150 generates the plurality of reference voltages having different voltage levels based on the converted voltage from the JFET 143 of the converter 140. For example, the reference voltage generator 150 generates first, second, third, and fourth reference voltages through the first, second, third, and fourth comparators 163-1, 163-2, 163-3, and 163-4, respectively, using the DC power source signal, Vcc, generated by the converter 140. In one configuration, voltage values of the first, second, third, and fourth reference voltages may gradually increase or decrease based in a particular order of the first, second, third, and fourth comparators 163-1, 163-2, 163-3, and 163-4. For example, if the first reference voltage is 1V, the second reference voltage may be 1.1V, the third reference voltage may be 1.2V, and the fourth reference voltage may be 1.3V. In another configuration, each of the voltage values of the first, second, third, and fourth reference voltages may be defined independently from the other voltage values of the first, second, third, and fourth reference voltages.

The control circuit 160 includes the plurality of switching elements 161-1, 161-2, 161-3, and 161-4 and the plurality of comparators 163-1, 163-2, 163-3, and 163-4. The control circuit 160 selectively lights the LED devices 130-1, 130-2, 130-3, and 130-4 according to the voltage level of the full-wave rectified AC power source signal.

The plurality of switching elements 161-1, 161-2, 161-3, and 161-4 may selectively force a plurality of nodes between the plurality of LED devices 130-1, 130-2, 130-3, and 130-4 to be grounded. For example, the first switching element 161-1 selectively forces the cathode of the first LED device 130-1 to be grounded based on a control signal of the first comparator 163-1. The first switching element 161-1 may be configured as an n-channel metal-oxide field-effect transistor (MOSFET (nMOS)) including a gate connected to an output terminal of the first comparator 163-1, a drain commonly connected to the cathode of the first LED device 130-1 and the anode of the second LED device 130-2, and a source connected to a ground through a resistor.

The second switching element 161-2 selectively forces the cathode of the second LED device 130-2 to be grounded based on a control signal of the second comparator 163-2. The second switching element 161-2 may be configured as an nMOS including a gate connected to an output terminal of the second comparator 163-2, a drain commonly connected to the cathode of the second LED device 130-2 and the anode of the third LED device 130-3, and a source connected to the ground through the resistor.

The third switching element 161-3 selectively forces the third LED device 130-3 to be grounded based on a control signal of the third comparator 163-3. The third switching element 161-3 may be configured as an nMOS including a gate connected to an output terminal of the third comparator 163-3, a drain commonly connected to the cathode of the second LED device 130-2 and the anode of the fourth LED device 130-4, and a source connected to the ground through the resistor.

The fourth switching element 161-4 selectively forces the cathode of the fourth LED device 130-4 to be grounded based on a control signal of the fourth comparator 163-4. The fourth switching element 161-4 may be configured as an nMOS including a gate connected to an output terminal of the fourth comparator 163-4, a drain connected to the cathode of the fourth LED device 130-4, and a source connected to the ground through the resistor.

In one configuration, the plurality of comparators 163-1, 163-2, 163-3, and 163-4 turn-on one of the plurality of switching elements 161-1, 161-2, 161-3, and 161-4 depending the voltage level of the full-wave rectified AC power source signal. In one example, the first comparator 163-1 may be configured as an operational amplifier (OP-AMP) including a negative terminal connected to the source of the first switching element 161-1, and a positive terminal receiving the first reference voltage and transmitting a comparison result to the gate of the first switching element 161-1. When the first reference voltage is higher than a voltage of the source of the first switching element 161-1, the first comparator 163-1 turns-on the first switching element 161-1.

The second comparator 163-2 may be configured as an OP-AMP including a negative terminal connected to the source of the second switching element 161-2, and a positive terminal receiving the second reference voltage and transmitting a comparison result to the gate of the second switching element 161-2. When the second reference voltage is higher than a voltage of the source of the second switching element 161-2, the second comparator 163-2 turns-on the second switching element 161-2.

The third comparator 163-3 may be configured as an OP-AMP including a negative terminal connected to the source of the third switching element 161-3, and a positive terminal receiving the third reference voltage and transmitting a comparison result to the gate of the third switching element 161-3. When the third reference voltage is higher than a voltage of the source of the third switching element 161-3, the third comparator 163-3 turns-on the third switching element 161-3.

The fourth comparator 163-4 may be configured as an OP-AMP including a negative terminal connected to the source of the fourth switching element 163-4, and a positive terminal receiving the fourth reference voltage and transmitting a comparison result to the gate of the fourth switching element 161-4. When the fourth reference voltage is higher than a voltage of the source of the fourth switching element 161-4, the fourth comparator 163-4 turns-on the fourth switching element 161-4.

Operations of a control circuit in a rectifier circuit, according to a level of a full-wave rectified AC power source, are described with reference to FIGS. 3 through 7.

Figure 3:
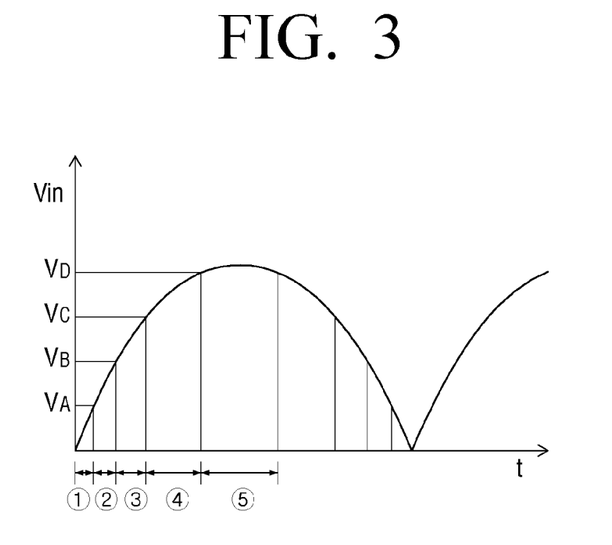
FIG. 3 is a graph illustrating a waveform of a full-wave rectified power source output from a rectifier circuit of FIG. 1.

FIG. 3 is a graph illustrating a waveform of a full-wave rectified power source output signal from the rectifier circuit 120 of FIG. 1.

Referring to FIG. 3, the rectifier circuit 120 rectifies an AC power signal. A power source signal, as shown in FIG. 3, is supplied to an LED array 130. An operation of the control circuit 160 performed when an output power source signal from the rectifier circuit 120 corresponds to sections ① and ② will be described with reference to FIG. 4. An operation of the control circuit 160 performed when the output power source signal from the rectifier 120 corresponds to section ③ will be described with reference to FIG. 5. An operation of the control circuit 160 performed when the output power source signal from the rectifier circuit 120 corresponds to section ④ will be described with reference to FIG. 6. An operation of the control circuit 160 performed when the output power source signal from the rectifier circuit 120 corresponds to section ⑤ will be described with reference to FIG. 7.

Figure 4:
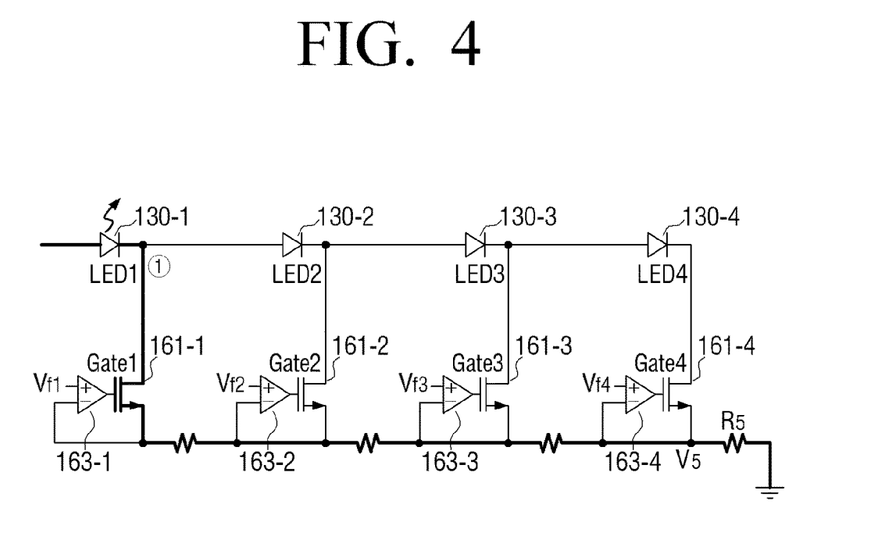
FIGS. 4 through 7 are views illustrating operations of a control circuit of FIG. 1, according to various illustrative configurations.

Referring to FIG. 4, when the output power source signal from the rectifier circuit 120 corresponds to section ①, the output power source signal from the rectifier circuit 120 is not sufficient voltage to turn-on the first LED device 130-1. Therefore, a current path is not formed, and all of the first, second, third, and fourth LED devices 130-1, 130-2, 130-3, and 130-4 do not emit light. However, because a current does not flow through a resistor R5, a voltage of the source of the first switching element 161-1 is also 0V. Also, because the first reference voltage is higher than the voltage of the source of the first switching element 161-1, the first comparator 163-1 turns-on the first switching element 161-1. However, the output power source signal from the rectifier circuit 120 is not sufficient voltage to turn-on the first LED device 130-1 as described above, and a current path is not formed between the rectifier circuit 120 and the ground.

When the output power source of the rectifier circuit 120 corresponds to section ②, the output power source signal from the rectifier circuit 120 is sufficient voltage to turn-on one LED device. Therefore, a current flows through the first LED device 130-1 to emit light, and a current path is formed to pass through the rectifier circuit 120, the first LED device 130-1, and the first switching element 161-1.

Figure 5:
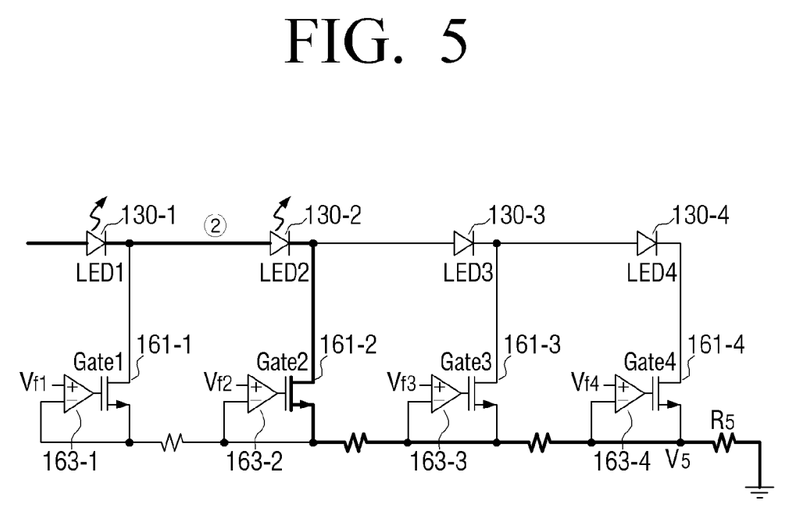

Referring to FIG. 5, when the output power source signal from the rectifier circuit 120 corresponds to section ③, the second reference voltage is higher than a voltage at the source of the second switching element 161-2, and, thus, the second comparator 163-2 turns-on the second switching element 161-2. Also, the output power source signal from the rectifier circuit 120 is sufficient voltage to turn-on two LED devices. Therefore, a current flows through the first and second LED devices 130-1 and 130-2. As a result, a current path is formed to pass through the rectifier circuit 120, the first LED device 130-1, the second LED device 130-2, and the second switching element 161-2. In one example, a voltage level of a negative terminal of the first comparator 163-1 increases, and the first comparator 163-1 turns-on the first switching element 161-1.

Figure 6:
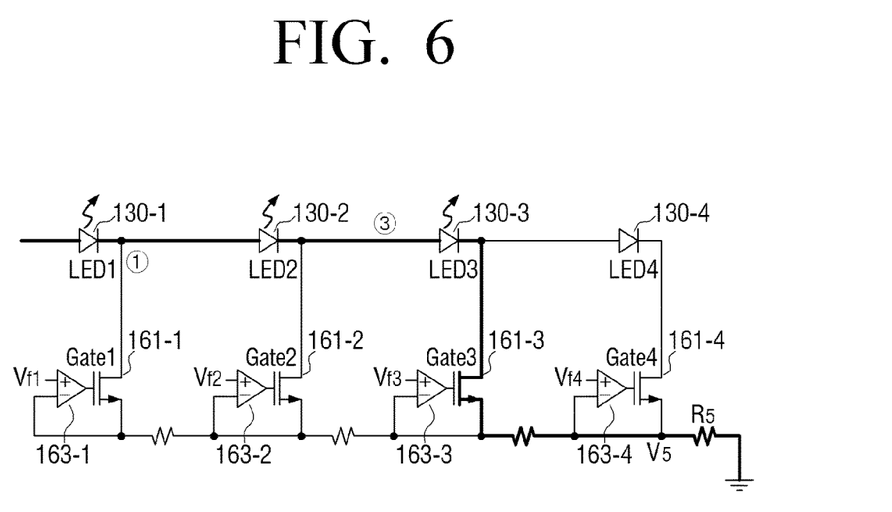

Referring to FIG. 6, when the output power source signal from the rectifier circuit 120 corresponds to section ③, the third reference voltage is higher than a voltage at the source of the third switching element 161-3, and, thus, the third comparator 163-3 turns-on the third switching element 161-3. Also, the output power source signal from the rectifier circuit 120 is sufficient voltage to turn-on three LED devices. Therefore, a current flows through the first, second, and third LED devices 130-1, 130-2, and 130-3 to emit light. As a result, a current path is formed to pass through the rectifier circuit 120, the first, second, and third LED devices 130-1, 130-2, and 130-3, and the third switching element 161-3. In one example, a voltage level of a negative terminal of the second comparator 163-2 increases, and the second comparator 163-2 turns-off the second switching element 161-2.

Figure 7:
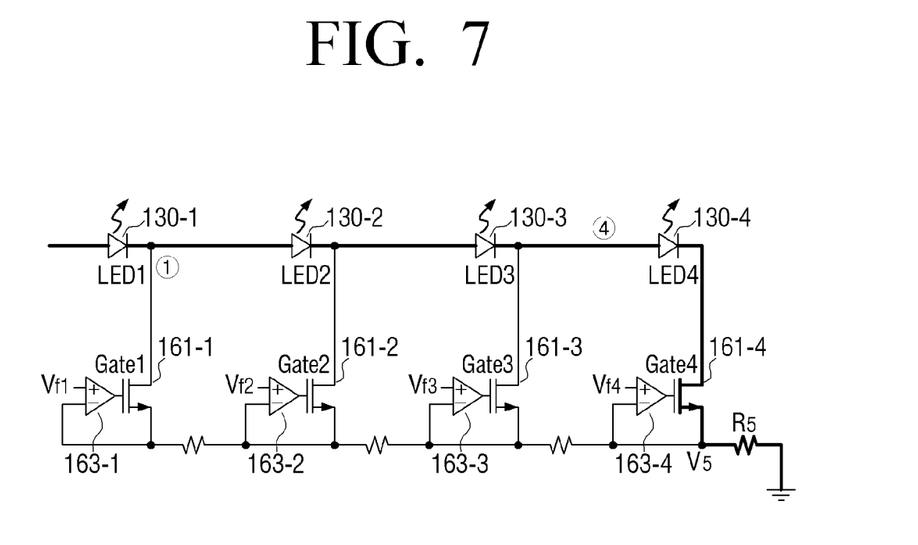

Referring to FIG. 7, when the output power source signal from the rectifier circuit 120 corresponds to the section ⑤, the fourth reference voltage is higher than a voltage of the source of the fourth switching element 161-4, and, thus, the fourth comparator 163-4 turns-on the fourth switching element 161-4. Also, the output power source signal from the rectifier circuit 120 is sufficient voltage to turn-on four LED devices. Therefore, a current flows through the first, second, third, and fourth LED devices 130-1, 130-2, 130-3, and 130-4 to emit light. Also, a current path is formed to pass through the rectifier circuit 120, the first, second, third, and fourth LED devices 130-1, 130-2, 130-3, and 130-4, and the fourth switching element 161-4. In one example, a voltage level of a negative terminal of the third comparator 163-3 increases, and the third comparator 163-3 turns-off the third switching element 161-3.

FIG. 8 is a view illustrating waveforms of nodes shown in FIG. 2. In detail, Vin denotes a waveform of an AC power source signal full-wave rectified through the rectifier circuit 120, and Vcc denotes a waveform of an output voltage from the converter 140. Also, Gate1 illustrates a waveform of an output power source of the first comparator 163-1. Gate2 illustrates a waveform of an output power source of the second comparator 163-2. Gate3 illustrates a waveform of an output power source of the third comparator 163-3. Gate4 illustrates a waveform of an output power source of the fourth comparator 163-4. ILED denotes a waveform of a current flowing through the LED array 130.

Referring to FIG. 8, a plurality of switching elements are controlled to be sequentially turned-on and turned-off according to a voltage level of the full-wave rectified AC power source signal. As a result, a plurality of LED devices can be driven at high efficiency.

It will be understood that, although the terms first, second, third, etc. may be used herein to describe various elements, components, units and/or sections, these elements, components, units and/or sections should not be limited by these terms. These terms are only used to distinguish one element, component, unit or section from another region, layer or section. These terms do not necessarily imply a specific order or arrangement of the elements, components, regions, layers and/or sections. Thus, a first element, component, unit or section discussed below could be termed a second element, component, unit or section without departing from the teachings description of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light apparatus using light-emitting diodes (LEDs), the light apparatus comprising:
   an LED array comprising LEDs operatively connected to one another in series;
   an input unit configured to receive an alternating current (AC) power source signal;
   a rectifier circuit configured to full-wave rectify the received AC power source signal and supply the full-wave rectified AC power source signal to the LED array;
   a control circuit configured to selectively light the LEDs based on a voltage level of the full-wave rectified AC power source signal;
   a converter configured to receive the full-wave rectified AC power source signal, output a direct current (DC) power source signal having a preset level, wherein the converter is further configured to convert the full-wave rectified AC power source signal into the direct current (DC) power source signal having the preset level, and at least one terminal of the converter is directly connected to a ground; and
   a reference voltage generator configured to generate reference voltages having different voltage levels using the DC power source signal from the converter,
   wherein the control circuit comprises
       switching elements configured to selectively force nodes between the LEDs to be grounded,
       comparators configured to turn-on one of the switching elements based on the voltage level of the full-wave rectified AC power source signal, and
       resistors connected in series between the switching elements and the ground.

2. The light apparatus of claim 1, wherein the converter is a junction gate field-effect transistor (JFET).

3. The light apparatus of claim 2, wherein the JFET comprises:
   a drain configured to receive the full-wave rectified AC power source signal;
   a gate configured to be grounded; and
   a source configured to output the DC power source signal having the preset level,
   wherein the reference voltage generator is configured to receive the DC power source signal having the preset level.

4. The light apparatus of claim 1, wherein the switching elements comprise n-channel metal-oxide semiconductor field-effect transistors (NMOSFETs).

5. The light apparatus of claim 1, wherein the LED array comprises:
   a first LED comprising an anode configured to receive the full-wave rectified AC power source signal; and
   a second LED comprising an anode operatively connected to a cathode of the first LED.

6. The light apparatus of claim 5, wherein the switching elements comprise:
   a first switching element comprising an end commonly connected to the cathode of the first LED and the anode of the second LED, and another end grounded through a resistor; and a second switching element comprising an end connected to a cathode of the second LED, and another end grounded through the resistor.

7. The light apparatus of claim 6, wherein the reference voltage generator is further configured to:
generate a first reference voltage; and
generate a second reference voltage having a higher voltage level than the first reference voltage.

8. The light apparatus of claim 7, wherein the comparators comprise:
a first comparator configured to turn-on the first switching element in response to the first reference voltage being higher than a voltage of the other end of the first switching device; and
a second comparator configured to turn-off the second switching element.

9. A light-emitting diode (LED) driver circuit configured to drive an LED array comprising LEDs, the LED driver circuit comprising:
a converter configured to convert a full-wave rectified alternating current (AC) power source signal into a direct current (DC) power source signal having a preset level, wherein the converter comprises a first terminal configured to receive the full-wave rectified AC power source signal, a second terminal configured to be grounded, and a third terminal configured to output the DC power source signal having the preset level;
a reference voltage generator configured to generate reference voltages comprising different voltage levels based on the DC power source signal having the preset level output from the converter;
switching elements configured to selectively force nodes between the LEDs to be grounded;
comparators configured to turn-on one of the switching elements based on a voltage level of the full-wave rectified AC power source signal; and
resistors connected in series between the switching elements and ground.

10. The LED driver circuit of claim 9, wherein the converter comprises a junction gate field-effect transistor (JFET).

11. The LED driver circuit of claim 10, wherein the JFET comprises:
a drain being the first terminal configured to receive the full-wave rectified AC power source signal;
a gate being the second terminal configured to be grounded; and
a source being the third terminal configured to output the DC power source signal having the preset level,
wherein the reference voltage generator is further configured to receive the DC power source signal having the preset level.

12. The LED driver circuit of claim 9, wherein the switching elements comprise n-channel metal-oxide semiconductor field-effect transistors (NMOSFETs).

13. The LED driver circuit of claim 9, wherein:
the LED array comprises
a first LED comprising an anode configured to receive the full-wave rectified AC power source signal, and
a second LED comprising an anode operatively connected to a cathode of the first LED; and the switching elements comprise
a first switching element comprising an end commonly connected to the cathode of the first LED and the anode of the second LED, and another end grounded through a resistor, and
a second switching element comprising an end connected to a cathode of the second LED and another end grounded through the resistor.

14. The LED driver circuit of claim 13, wherein the reference voltage generator is further configured to:
generate a first reference voltage; and
generate a second reference voltage having a higher voltage level than the first reference voltage.

15. The LED driver circuit of claim 14, wherein the comparators comprise:
a first comparator configured to turn-on the first switching element in response to the first reference voltage being higher than a voltage of the other end of the first switching element; and
a second comparator configured to turn-off the second switching element.

16. The LED driver circuit of claim 9, wherein the comparators are configured to turn-on only one of the switching elements based on the voltage level of the full-wave rectified AC power source signal.

17. A light apparatus using light-emitting diodes (LEDs), the light apparatus comprising:
a rectifier circuit configured to full-wave rectify a received alternating current (AC) power source signal and supply the full-wave rectified AC power source signal to an LED array;
a converter configured to convert the full-wave rectified AC power source signal into a direct current (DC) power source signal having a preset level, wherein at least one terminal of the converter is directly connected to a ground;
a reference voltage generator configured to generate reference voltages having different voltage levels based on the DC power source signal from the converter; and
a control circuit configured to selectively light the LEDs based on a voltage level of the full-wave rectified AC power source signal by selectively forcing nodes between the LEDs to be grounded, and by turning-on one switching element based on the voltage level of the full-wave rectified AC power source signal,
wherein the control circuit comprises resistors connected in series between the switching elements and the ground.

18. The light apparatus of claim 17:
wherein the control circuit is further configured to turn-on only one switching element based on the voltage level of the full-wave rectified AC power source signal.

19. The light apparatus of claim 18, wherein the LED array comprises
a first LED comprising an anode configured to receive the full-wave rectified AC power source signal, and
a second LED comprising an anode operatively connected to a cathode of the first LED.

* * * * *